(No Model.)
T. WATKINS.
SEWER TRAP.
No. 298,045. Patented May 6, 1884.
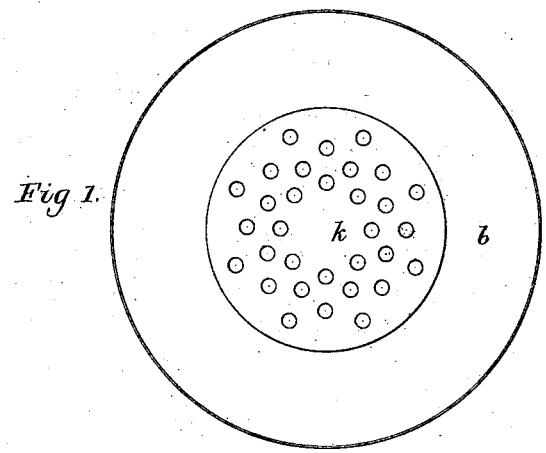
Fig. 1.
Fig. 2.
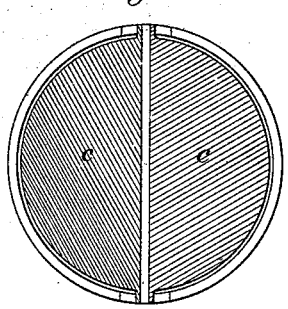
Fig. 3.
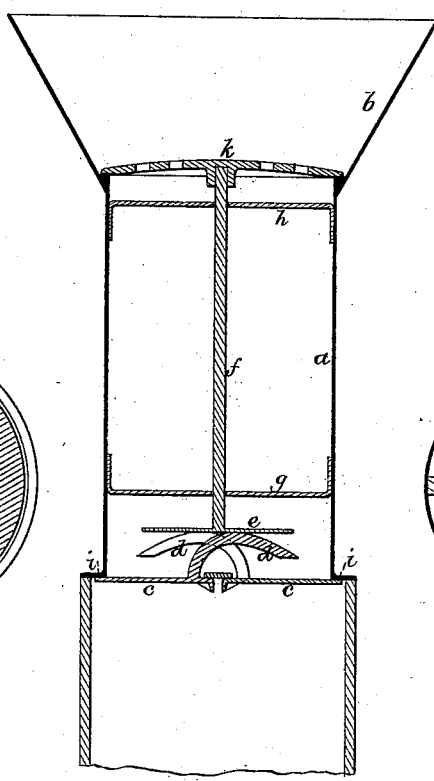
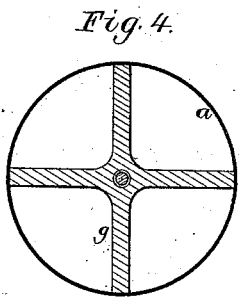
Fig. 4.
Witnesses.
S. N. Piper
E. S. Pratt
Inventor.
Thomas Watkins
by R. H. Eddy att'y

UNITED STATES PATENT OFFICE.

THOMAS WATKINS, OF PORTSMOUTH, NEW HAMPSHIRE.

SEWER-TRAP.

SPECIFICATION forming part of Letters Patent No. 298,045, dated May 6, 1884.

Application filed July 17, 1883. (No model.)

*To all whom it may concern:*

Be it known that I, THOMAS WATKINS, of Portsmouth, in the county of Rockingham, of the State of New Hampshire, have invented a new and useful Improvement in Sewer-Traps; and I do hereby declare the same to be described in the following specification and represented in the accompanying drawings, of which—

Figure 1 is a top view, and Fig. 2 a vertical section, of a sewer-trap containing my invention, the nature of which is defined in the claims hereinafter presented. Fig. 3 is a horizontal section taken through the trap-valves, to show their pivots. Fig. 4 is a horizontal section taken through one of the spiders.

This trap is intended for application to a street-gutter or to a sink or other object, and to discharge water therefrom into a drain or sewer and prevent the escape of noxious gas from such drain or sewer. The body of the trap consists of a tube, $a$, provided at top with a flaring mouth, $b$. Within the lower part of the body are two valves, $c\ c$, each being semicircular or segmental or otherwise properly formed, and pivoted at one edge or chord to the tube, or to a plate or bar extending diametrically across such tube. Each valve opens downward, and has a curved projection or horn, $d$, extending upward from it in manner as shown. Resting on these projections is the "valve-closer," which consists of a disk, $e$, a rod or spindle, $f$, and a cap or cover, $k$. The rod is extended upward and axially within the tubular body $a$, and is supported by and adapted to slide lengthwise in two spiders, $g$ and $h$, arranged within the body, in manner as shown. The rod $f$, at its upper part, is fastened to the perforated disk or cover $k$, which extends across the upper end of the tube $a$, or is arranged within the mouth $b$, in manner as represented. The valves are closed upon their seat $i$ by the weight of the closer or connected disk $e$, rod $f$, and perforated disk $k$, in consequence of the disk $e$ resting directly upon the two horns of the valves. The lower spider, besides serving as a guide and support for the rod $f$, answers as a stop for the closer, to arrest it in its upward movement, in order to limit the fall or depression of each of the valves, for when the valves are open their horns will bear against the disk $e$, which in turn will bear against the lower spider.

While there may be no water running into the trap, the valves will be closed by the downward pressure of the closer upon the horn or horns, the weight of such closer being a little more than may be requisite to effect the closing of the valves; but on water passing through or around the disk $k$ and into the body $a$ and upon the valves in sufficient quantity to depress such valves or overcome the weight of the closer, the valves will be opened, so as to allow of the escape of any surplus water, from which it will be seen that the trap is "self-acting" or automatic. While the trap-valve may be closed, or there may be no water flowing from the sink or street into the trap, such valves will prevent discharge of sewer-gas upward into and through and from the trap. So, when the trap may be discharging water, such water will operate to prevent discharge of sewer-gas. Generally speaking, there will be in the body $a$ and on the valves a small amount of water, which will suffice to seal the valves, so as to efficiently prevent escape of sewer-gas.

I do not claim a trap constructed in either of the ways described and represented in the British Patent No. 2,643 for the year 1878, as my improved sewer-trap, though analogous in some respects to one or more of the traps shown in said patent, differs therefrom in important particulars both as respects construction and operation. There is to my said trap no elastic bag or float, as shown in the traps of the said British patent; nor are there any horn or horns to the valves, nor any valve-closer thereto, as in my said trap.

I claim—

1. In the described improved sewer-trap, the combination of each of its valves, arranged with and applied to the tubular body of the trap as specified, with a horn to extend upward from it, (the said valve,) and with a valve-closer resting upon such horn, and to operate with it, substantially as set forth.

2. The combination of the valve-closer (consisting of the strainer or perforated cover or plate $d$, the rod $f$, and the disk $e$) with guide-spiders $g$ and $h$, the tube $a$, the valves $c\ c$, and their horns $d\ d$, adapted and arranged as set forth.

THOMAS WATKINS.

Witnesses:
R. H. EDDY,
E. B. PRATT.